W. H. WYMAN.
MACHINE FOR MAKING BRIQUETS.
APPLICATION FILED NOV. 9, 1907.

953,655.

Patented Mar. 29, 1910.
8 SHEETS—SHEET 1.

W. H. WYMAN.
MACHINE FOR MAKING BRIQUETS.
APPLICATION FILED NOV. 9, 1907.

953,655.

Patented Mar. 29, 1910.

W. H. WYMAN.
MACHINE FOR MAKING BRIQUETS.
APPLICATION FILED NOV. 9, 1907.

953,655.

Patented Mar. 29, 1910.

Witnesses
J. M. Fowler Jr.
A. S. Kitchin

Inventor
William H. Wyman
By Mason Fenwick & Lawrence
his Attorneys

W. H. WYMAN.
MACHINE FOR MAKING BRIQUETS.
APPLICATION FILED NOV. 9, 1907.

953,655.

Patented Mar. 29, 1910.

Witnesses
J. M. Fowler Jr.
O. S. Kitchin

Inventor
William H. Wyman
By Mason Fenwick & Lawrence
his Attorneys

UNITED STATES PATENT OFFICE.

WILLIAM H. WYMAN, OF OSHKOSH, WISCONSIN.

MACHINE FOR MAKING BRIQUETS.

953,655.  Specification of Letters Patent.  Patented Mar. 29, 1910.

Application filed November 9, 1907. Serial No. 401,510.

*To all whom it may concern:*

Be it known that I, WILLIAM H. WYMAN, citizen of the United States, residing at Oshkosh, in the county of Winnebago and State of Wisconsin, have invented certain new and useful Improvements in Machines for Making Briquets, of which the following is a specification.

This invention relates to improvements in machines for pressing coal and analogous materials into blocks or so called briquets.

The invention comprises the production of a mold-wheel, means for compressing material in the mold-wheel, plungers for forcing the compressed material from the wheel, and mechanism for operating all of said means and said wheel in timed relation to each other.

The invention further comprises mechanism for imparting intermittent motion to the mold-wheel so as to advance the same in successive steps for permitting pressure plungers to compress material in the wheel while the wheel is stationary.

The invention also comprises the production of relief springs and mechanism connected thereto for preventing undue pressure to be brought upon the material being pressed.

The object in view is the production of a molding machine that will substantially continuously deliver material to the mold and to intermittently compress part of said material.

Another object in view is the production of a mold-wheel for receiving material to be pressed, plungers for acting in opposition to each other for compressing said material, means for operating said plungers, and at the same time ejecting some of the compressed material.

A still further object in view, is the provision of a molding machine that will substantially continuously operate for pressing material to any degree of compactness and of substantially uniform size, and after compression to eject and deliver the compressed material to a predetermined position.

With these and other objects in view the invention comprises certain novel constructions, combinations, and arrangements of parts that will be hereinafter fully described and claimed.

In the accompanying drawings.

In constructing a device for compressing material it is desirable to arrange the same so as to continuously carry material into the machine and to receive a substantially continuous stream of the manufactured or compressed article from the machine so that there will be no loss of time in charging and discharging the machine. In the present invention it is designed to accomplish the results just suggested, and, as the machine forming the subject matter of the present invention is designed more particularly to press coal and analogous material into blocks or briquets, it is arranged to press certain of the coal at one operation and at the same time eject blocks or briquets that have been previously formed. By this arrangement, when the machine is set in operation, one or more blocks are pressed and one or more are discharged in a completed condition at the same time.

Figure 3:
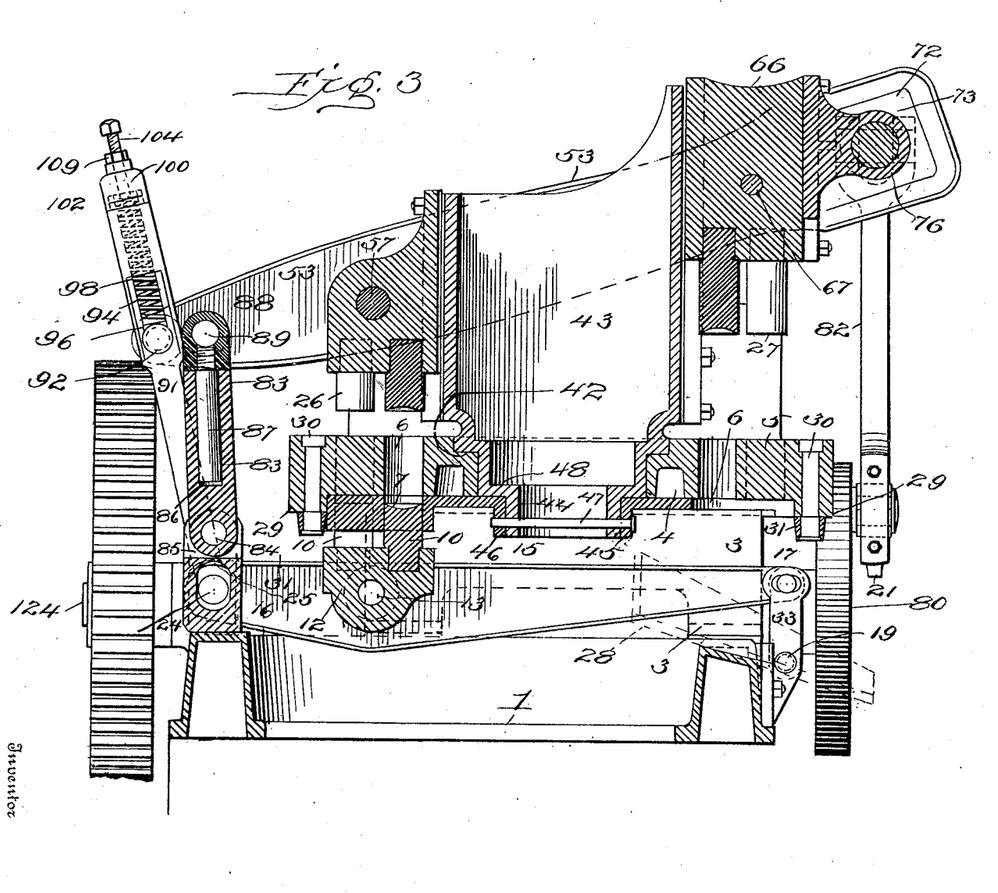
Fig. 3 is a section of Fig. 1 on line 3—3.
Figure 4:
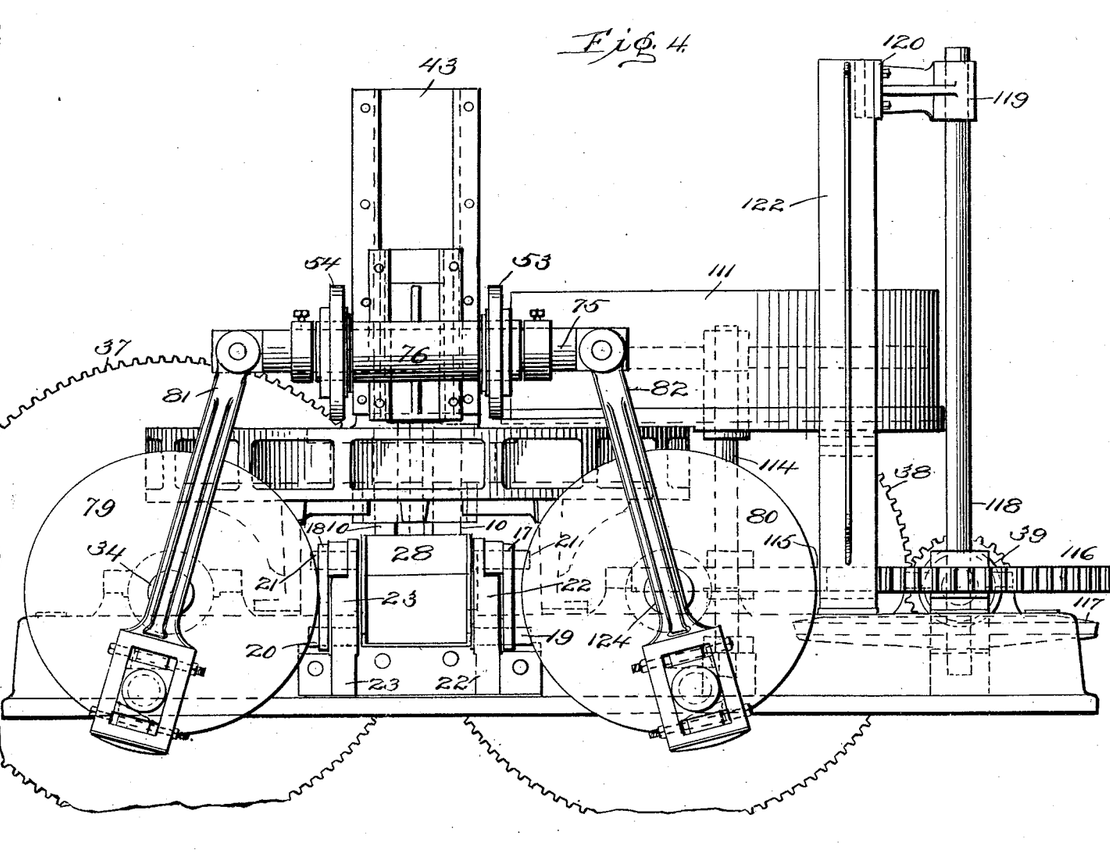
Fig. 4 is a side view of the machine embodying the features of the present invention.
Figure 5:
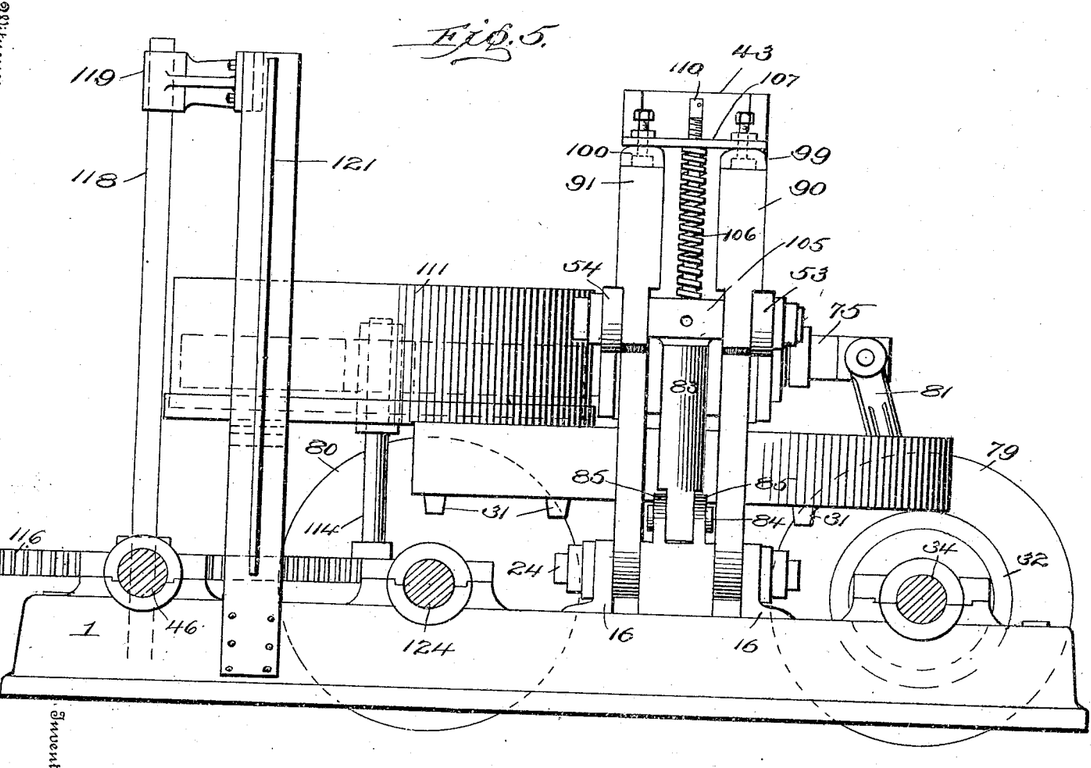
Fig. 5 is a side elevation of a machine embodying the features of the present invention, looking from the opposite side to Fig. 4.

Referring more particularly to the drawing, 1 indicates a base mounted upon a suitable foundation 2. Base 1 is designed to accommodate a second base or support 3, which is firmly secured thereto by any suitable means so that any strain upon the second or sub-base 3 will not move the same from its correct position. The sub-base 3 is formed with a wheel or disk member 4 upon which the mold-wheel 5 is designed to rest. The disk 4 is provided with an opening 6 through which the final product of the machine is forced. Opposite to opening 6 is a plurality of openings 7, 8, and 9. The openings 7, 8, and 9 are designed to receive plungers 10 for guiding the same into openings 11 in wheel 5. The disk 4 is formed at the point of the openings 7, 8, and 9 considerably thicker, as clearly seen in Fig. 3 so as to form substantial guide for plungers 10. Plungers 10 are mounted in a pivotally mounted support 12 which in turn is supported by journal 13 which passes through supporting or compressing levers 14 and 15. The supporting or compressing levers 14 and 15 are designed to extend from a supporting member 16 on one side of the machine to supporting links 17 and 18 on the other side of the machine. The supporting links 17 and 18 are journaled on axles or shafts 19 and 20, as clearly seen in Fig. 4. A shaft or axle 21 is designed to pass through levers 14 and 15 for supporting links 17 and 18 and brackets 22 and 23 for guiding levers 14 and 15. Links 17 and 18 are designed to support shaft 21 and consequently levers 14 and 15, while brackets 22 and 23 support the links 17 and 18 through shafts 19 and 20. An elongated opening in brackets 22 and 23 at the upper end through which shaft 21 passes is designed to permit a longitudinal movement of levers 14 and 15 and a lateral movement of shaft 21. The openings near the top of brackets 22 and 23 are preferably struck upon the arc of a circle from shaft 19 as a center. By this construction and arrangement levers or brackets 14 and 15 are permitted a slight reciprocatory movement and also a pivotal movement. At the side of the machine opposite to brackets 22 and 23 is a supporting member 16 in which levers 14 and 15 are journaled. A shaft 24 is designed to pass through both of levers 14 and 15 and extend far enough beyond the same to receive means for preventing any longitudinal movement of the shaft. Supporting member 16 is formed with a hollowed-out portion 25 in which shaft 24 is positioned and as shaft 24 is of less diameter than the width of opening 25 the same may move laterally for permitting a slight reciprocatory movement of levers 14 and 15. The opening 25 is also made oblong as seen in Fig. 3 so as to permit a vertical movement of shaft 24. By thus permitting a vertical and a longitudinal movement of levers 14 and 15, plunger supporting member 12 is forced directly upward and the plungers 10 exactly register with the openings 11. The pivotal mounting of member 12 assists in this and also the guiding opening 7 so that plungers 10 are always given a vertical movement so as to engage or pass into openings 11 when the same are in proper position and plungers 10 are moved upward. In this connection it will be observed that the supporting member 12 carries 3 plungers, two of which are positioned more nearly directly over shaft 13 than the remaining one. This will permit the correctly distributing of the pressure upon all three plungers.

Positioned above sub-base 3 is a mold or mold-wheel 5 provided with any desired number of openings or mold holes 11. The openings or mold holes 11 are arranged in groups for properly registering with plungers 10 and also plungers 26, the plungers 10 being known as auxiliary plungers and the plungers 26 as the main plungers. In addition to the plungers just mentioned there are provided ejecting plungers 27 arranged in a similar manner to plungers 26 but on the opposite side of the machine and above opening 6 in disk 4. The mold-wheel 5 is designed to receive loose coal or other material to be pressed into openings 11 and then, the openings brought beneath plungers 26 and above plungers 10, disk plate 4 not permitting any of the material in openings 11 to pass therethrough until the openings have arrived at a position above opening 6. After the opening 11 has received the material to be pressed and come beneath plungers 26 and above plungers 10, the plungers are caused to move toward each other as hereinafter fully described, for pressing the material in opening or chamber 11. It is designed to have plungers 10 move upward simply far enough for only slightly entering chamber or opening 11 while plungers 26 are designed to pass downward into openings 11 a considerable distance for thoroughly pressing the material therein. After the material has been pressed the plungers are withdrawn from the openings 11 in wheel 5 and immediately after the plungers have been removed from engaging with the openings 11 the wheel 5 will rotate until the next succeeding group of openings or chambers 11 is beneath plungers 26. Plungers 26 and plungers 10 will operate as just set forth upon the new set of chambers and will continue to engage each succeeding group of openings 11 as wheel 5 rotates. At each time that plungers 26 and 10 compress material in one group of chambers or openings 11 plungers 27 will force out or discharge from chambers 11 one set of compressed material into a chute 28 which will deliver the finished article to any convenient point outside of the machine.

In order to hold the wheel 5 in proper position the same is made with a depending flange 29 that extends entirely around the wheel and is designed to pass over and to engage the periphery of the disk on plate 4 which is firmly and rigidly held against movement. Passing through outer edge of wheel 5 are bolts 30 that are designed to hold bearing or anti-friction wheels 31 in position for engaging a cam 32. The wheels 31 are preferably slightly beveled so as to easily engage the surfaces of the cam 32 and to permit disengagement at the proper time.

Figure 2:
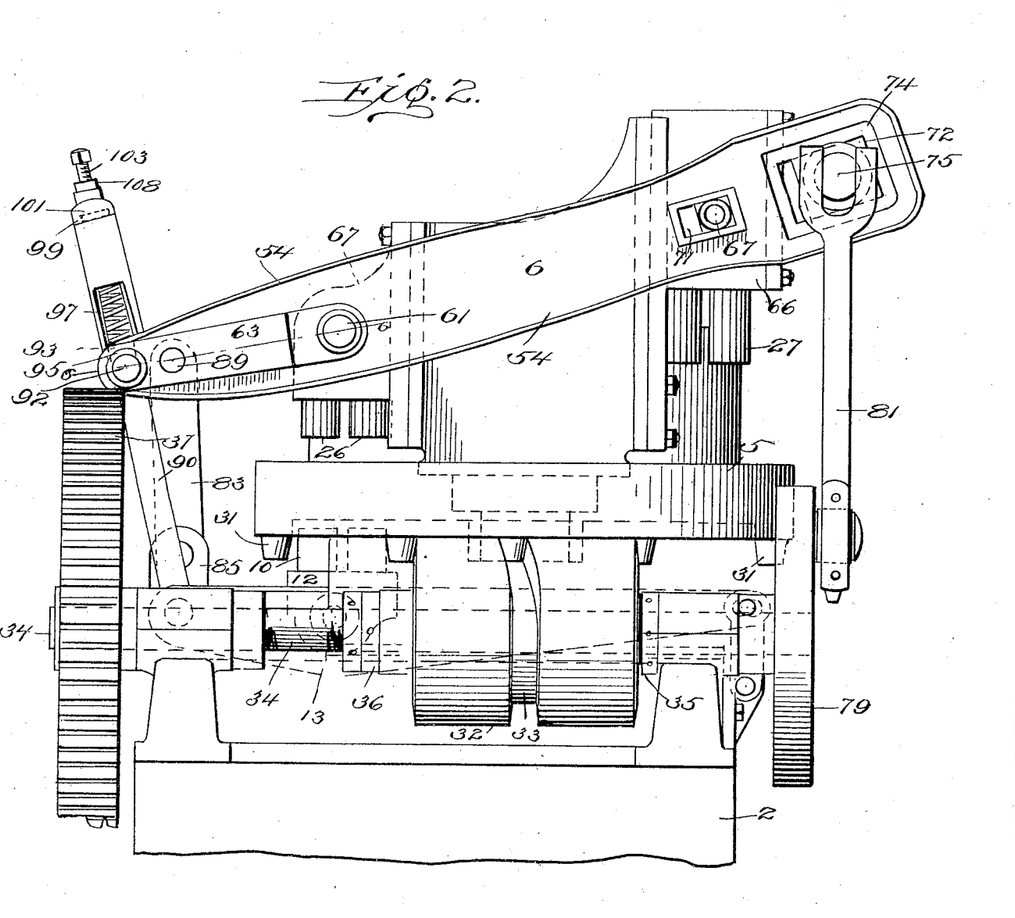
Fig. 2 is an end view of Fig. 1.

In this connection it will be observed that cam 32 is formed with a single groove or cam surface 33 that is somewhat on the order of a worm-thread, except that at certain points the threads or cam surface does not progress but passes around the cam member 32 in the same cross-sectional plane. By this arrangement whenever one of the wheels 31 engages the beveled part of cam surface 33 the wheel 5 will be rotated. The rotation will continue until the wheel 31 has entirely left cam 32 or reached that portion of the cam surface 33 that is arranged in the same cross-sectional plane and makes no advance as it passes around the cam member 32. Cam member 32 is designed to continuously rotate and by the construction of the cam surface 33, the wheel 31, and consequently the mold-wheel 5 will only be advanced when the wheel 31 is in engagement with that part of the cam surface 33 which advances as it passes around the cam similar to a thread or worm. Cam 32 is splined to a shaft 34 so as to rotate therewith but remain capable of longitudinal adjustment along the shaft. In order to properly adjust and hold in adjusted position cam 32 suitable locknuts 35 and 36 are provided at each end of the cam and are preferably screw threaded upon shaft 34, though it will be evident that a ring or washer might be used and a set screw provided therein for preventing any movement thereof. If it is desired to move or adjust cam 32 toward the left as seen in Fig. 2 locknuts 36 are moved toward the left or loosened and locknut 35 is tightened or moved toward the left. By this means it will be evident that cam 32 will be moved in the direction that the locknuts 35 and 36 are moved. When the cam is thus moved one way or the other the same varies the position of openings or chambers 11 in mold-wheel 5 in relation to plungers 26. When first setting up the machine cam 32 is adjusted so as to have the straight part of the cam surface 33 that makes no progress as it travels around the cam 32 in such a position as to engage one of the wheels 31 during the time that plunger 26 is in engagement with chamber 11. In order to provide means for moving cam 32 a gear wheel 37 is rigidly secured to shaft 34. Gear 37 in turn is designed to mesh with gear 38 which receives power from a gear 39. Gear 39 in turn is designed to move by a shaft 40 that receives power from any suitable source.

Figure 1:
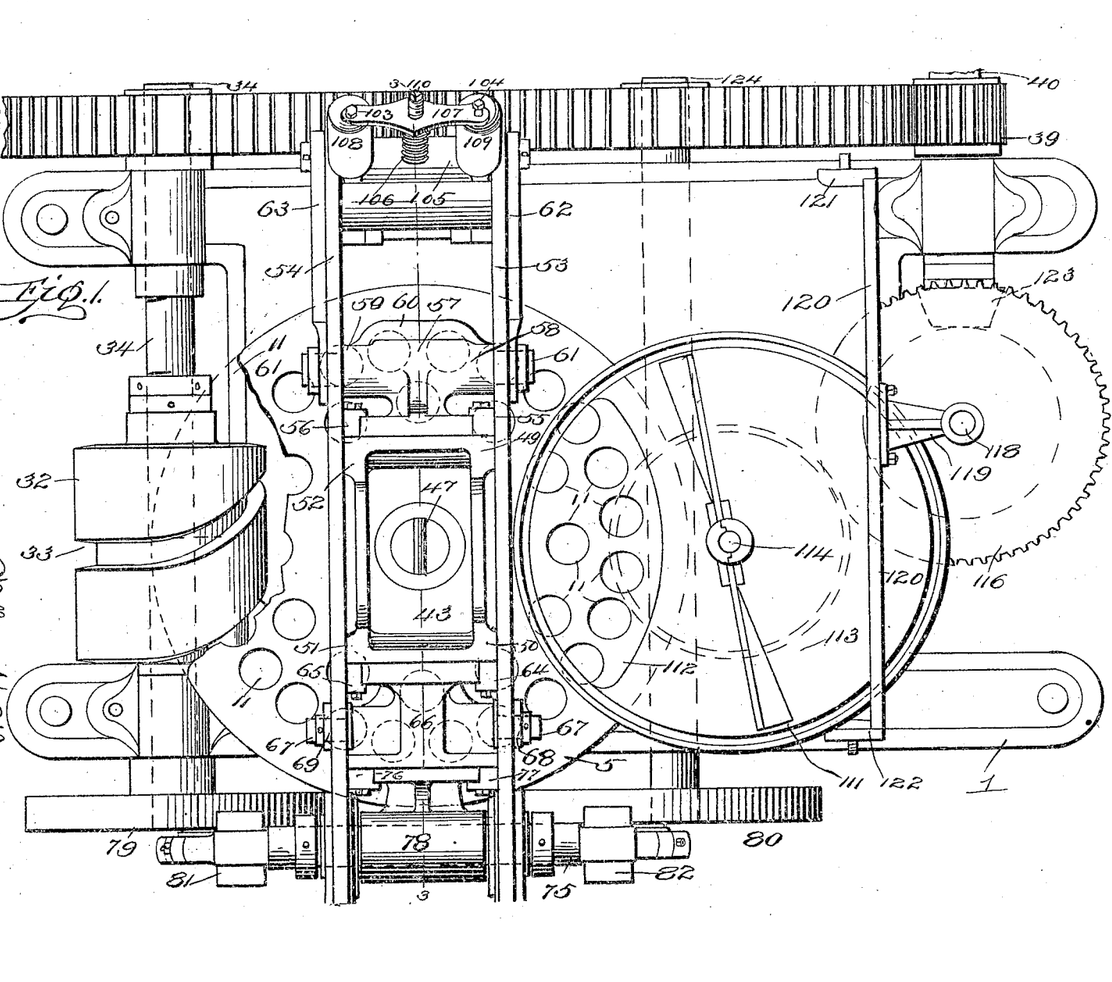
Figure 1 is a top plan view of a machine embodying the features of the present invention.

Mold-wheel 5 is formed with an opening 41 centrally thereof and also with an off-set portion 42. The opening 41 and off-set portion 42 are designed to receive the lower end of the frame or guiding member 43. The off-set portion 42 is machined and also the part of the frame 43 that engages the same is machined so as to form a smooth bearing for mold-wheel 5 between frame 43 and disk or plate 4. The frame 43 is also provided with a reduced extended portion 44 that passes through an opening 45 in plate 4. The plate 4 is formed with a depending flange 46 at opening 45 for accommodating a tie rod or bolt 47 that passes through both the flange 46 and the extension 44 of frame 43. The frame 43 is also provided with a horizontal or off-set portion 48 that is designed to rest upon the upper surface of plate 4 around openings 45 so as to form a support for frame or member 43. The member or frame 43 is preferably machined from the lower portion thereof that passes through opening 45 up to the upper surface of wheel 5 so that wheel 5 is provided with a smooth journal or bearing surface around which the same is designed to move. This is necessary in order that the openings or chambers 11 may be brought to register with plungers 26, 10 and 27. The upper part of frame 43 may be of any desired shape but preferably rectangular as seen in Fig. 1 and is formed with flanges 49, 50, 51 and 52 that are designed to engage compression levers 53 and 54 that will be hereinafter more fully described. The flanges or projections 49, 50, 51 and 52 are designed to be machined so as to form a guide or bearing against which levers 53 and 54 act so as to always hold the levers in proper relation to each other and to the surrounding mechanism.

Secured to one side of the frame 43 are guides 55 and 56 in which a reciprocating member or plunger supporter 57 reciprocates. The plunger supporting member 57 is formed with substantially cylindrical portions 58 and 59 for forming bearings to rest against levers 53 and 54. An enlarged portion 60 is provided for receiving plungers 26 which are held in position therein in any convenient way, preferably by being forced therein and held by friction. The cylindrical portions 58 and 59 are designed to receive a shaft 61 that passes through levers 53 and 54 and also reinforcing levers 62 and 63 for providing means for conveying power from levers 53 and 54 and levers 62 and 63 to member 57 and from them to plungers 26. On the opposite end through guide ways 55 and 56 are guiding members 64 and 65. Guiding members 64 and 65 are designed to receive a plunger carrying member 66. The plunger carrying member 66 is provided with plungers 27 as seen in Fig. 3 which are designed to be preferably of such a length as to pass entirely through chambers or openings 11 in mold-wheel 5 and to project a short distance beyond the same for forcing out of the opening or chamber the compressed material contained therein. In order to receive power for plungers 27, a shaft 67 passes through levers 53 and 54 and through plunger carrying member 66.

Both the shafts 61 and 67 as will be seen pass through both the levers 53 and 54. Shaft 61 is journaled directly in levers 53 and 54 while shaft 67 is designed to reciprocate in a vertical plane and consequently is provided with journal boxes 68 and 69 that reciprocate in openings 70 and 71. It is necessary to provide openings 70 and 71 and bearing members 68 and 69 as shaft 67 moves in a vertical plane and levers 53 and 54 pivot upon shaft 61. Formed near the extreme end of levers 53 and 54 are openings 72—72 in which bearing boxes 73 and 74 slide. Bearing boxes 73 and 74 are designed to accommodate the shaft 75. Shaft 75 carries a guiding member 76 that is designed to slide in the ways 77 and 78 that are secured to member 66. By this construction when levers 53 and 54 are moved downward member 66 slides in ways 64 and 65, and member 76 slides in ways 77 and 78. In this way the shaft 75 is kept a certain distance from frame 43 and directly above the journals or wrist-pins on disk members 79 and 80 so that connecting rods 81 and 82 may move upward and downward in a vertical plane, the upper ends of rods 81 and 82, being pivotally secured to the ends of rod 75 as clearly seen in Figs. 1 and 2.

Figure 6:
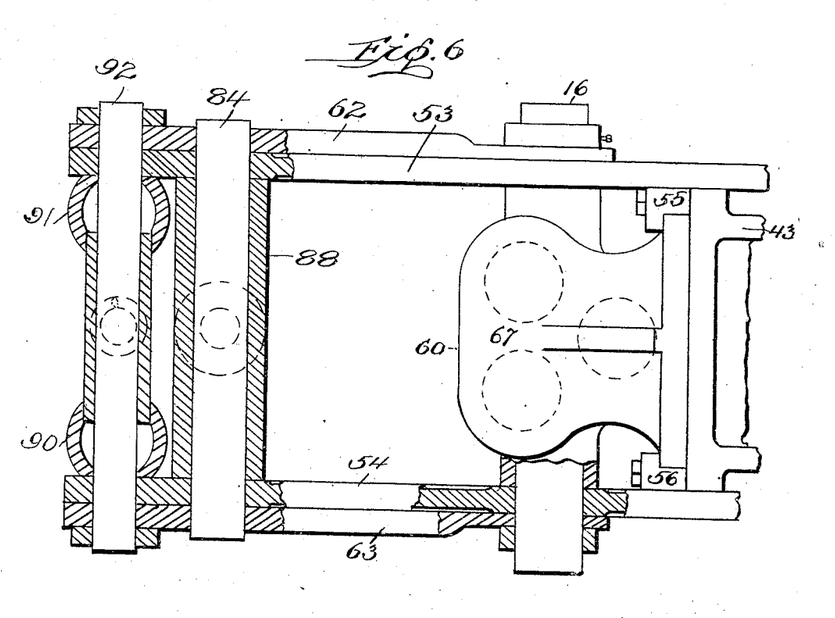
Fig. 6 is a section through Fig. 2 on line 6—6.
Figure 7:
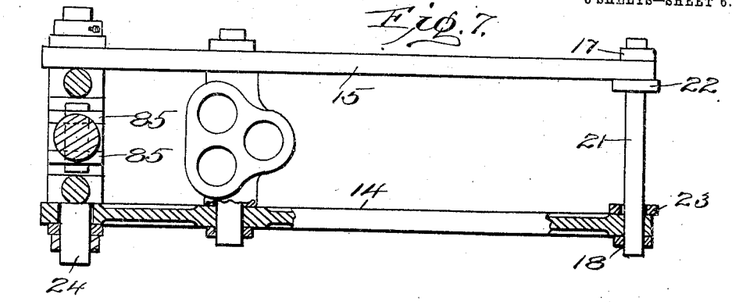
Fig. 7 is a top plan view of supporting levers and connected mechanism of an auxiliary compressor, certain parts being broken away to better disclose the invention.
Figure 8:
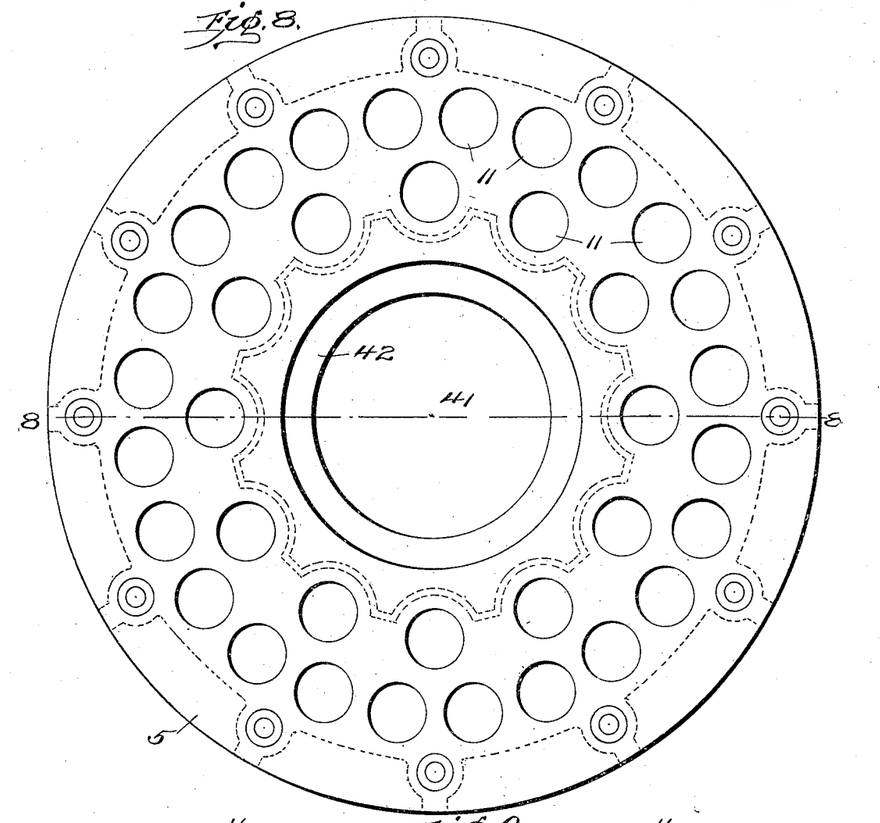
Fig. 8 is a top plan view of a mold-wheel forming part of the present invention.
Figure 9:
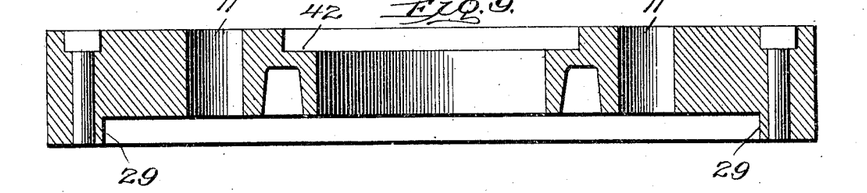
Fig. 9 is a section through Fig. 8 on line 9—9.
Figures 10, 12:
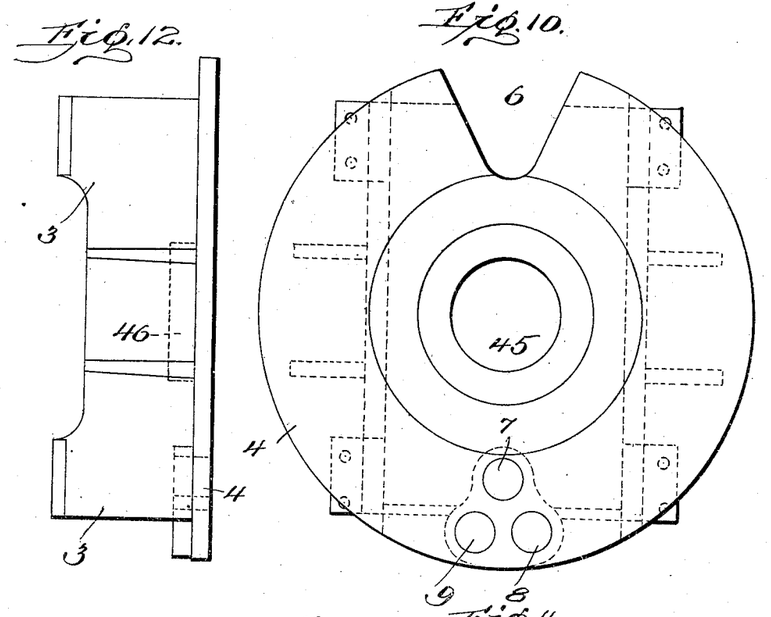
Fig. 10 is a top plan view of a supporting disk forming part of the present invention.
Fig. 12 is an edge view of Fig. 10 taken at right-angles to Fig. 11.
Figure 11:
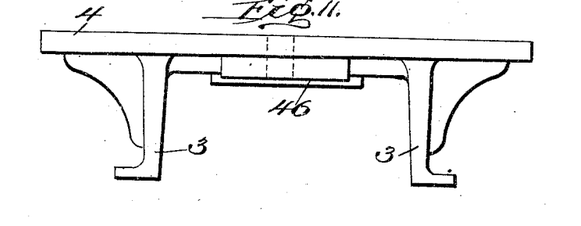
Fig. 11 is an edge view of Fig. 10.

Pivotally mounted upon member 16 is a fulcrum 83. Fulcrum 83 is journaled upon a shaft 84 which in turn is supported by members 85—85. Fulcrum 83 is provided with an opening 86 which is designed to accommodate a smooth shaft or bar 87 which is rigidly secured to a cross bar 88 formed substantially T shaped. The T shaped member 88 is pivotally mounted on a shaft 89 that in turn is journaled in levers 53 and 54 and bars 62 and 63 as clearly seen in Fig. 6. By this construction it will be observed that shaft 89 may descend and consequently the end of the levers 53 and 54 may descend until T member 88 engages fulcrum 83 and then downward movement must cease, but by reason of bar 87 being adapted to slide or reciprocate in opening 86 shaft 89 may be raised to any desired height and also levers 53 and 54 that carry same. Member 88 is designed to extend from lever 53 to lever 54 so as to hold the same in proper position and also to be held in proper position. At the extreme end of levers 53 and 54 as seen in Fig. 6 are pivotally mounted arms 90 and 91. The lower ends of the arms 90 and 91 are journaled on shaft 24 and are permitted to have a pivotal movement without disturbing the position of shaft 24. When a longitudinal movement of the arms are given a corresponding vertical movement of shaft 24 is given and also to shaft 13 that supports member 12 which in turn carries plungers 10. About midway of the length of arms 90 and 91 is a shaft 92 that also passes through levers 53 and 54 and bars 62 and 63. The shaft 92 is designed to reciprocate or move laterally in openings 93 and 94. Positioned above shaft 92 are bearing members 95 and 96 which are designed to support springs 97 and 98. The upper part of arms 90 and 91 are formed cylindrical and are designed to accommodate in the openings in the center thereof, springs 97 and 98 and forms guides therefor so that any time any pressure is brought upon shaft 92 the same will be forced upward against the action of the springs and the springs resist such pressure according to the tension thereof. The arms 90 and 91 are provided with caps 99 and 100 respectively, and are preferably screw threaded for holding same in position. Suitable plates 101 and 102 are provided for engaging the upper ends of the springs and in turn are designed to be engaged by screws 103 and 104 for regulating the position of the plates 101 and 102 and consequently the tension of springs 97 and 98.

Positioned between arms 90 and 91 and journaled upon shaft 92 is a supporting or bearing member 105 that is designed to accommodate spring 106. Spring 106 extends upward and engages a cross bar 107 that is held in position by nuts 108 and 109. Passing through plate 107 is an adjusting member or set screw 110 that is designed to regulate the tension of spring 106. By this means shaft 92 is compelled to compress three springs in order to move longitudinally of arms 90 and 91.

It will be observed that levers 53 and 54 are journaled upon shaft 61 and are permitted no longitudinal movement. This necessitates the pivotally mounting of fulcrum 83 and arms 90 and 91 for accommodating the various positions of the end of levers 53 and 54. The rods 81 and 82 at the end opposite to fulcrum 83 are accommodated by openings 72 in order to permit the levers 53 and 54 to be pivotally mounted upon shaft 61 and yet move in a vertical plane at all times.

On one end of the machine is provided a hopper 111 that projects over and covers part of mold-wheel 5 and is designed to feed the material to be pressed into the openings or chambers 11 through an opening 112 in the bottom of the hopper. The bottom of the hopper 111 is designed to fit closely against the top of the mold-wheel 5 so that as the material to be pressed is forced through opening 112 in the openings or chambers 11 none of the same will escape between wheel 5 and the bottom of hopper 111 during the rotation of the mold-wheel 5. Positioned in hopper 111 are stirrers 113 that not only stir the material but also force the same into opening 112. The stirrers 113 are rigidly secured to a shaft 114 that has secured thereto near one end thereof a gear 115. The gear 115 is designed to mesh with a second gear 116 which in turn receives power from beveled gear 117 through shaft 118. Shaft 118 is journaled at one end in the base and at the other end in a bracket 119. The bracket 119 in turn is secured to a cross bar 120 that is held in position by supporters 121 and 122. Bevel gear 117 is designed to receive power from shaft 40 through gear 123. By this means when shaft 40 is rotated gear 123 will be rotated and from thence power will be conveyed to stirrers 113 for stirring and forcing the material in openings or chambers 11.

In operation the coal or other material that is designed to be formed into blocks or briquets is placed in hopper 111 and from thence forced by stirrers 113 through opening 112 into chambers or opening 11 of mold-wheel 5. After the material has been provided and some of same placed in hopper 111 shaft 40 is rotated by any suitable means which will cause stirrers 113 to move, power being transmitted through bevel wheel 123, 117, gear wheels 116 and 115 and shaft 114. At the same time shaft 40 rotates gear 39 which in turn rotates gears 38 and 37. Gear 38 is rigidly secured to a shaft 124 and gear 37 is rigidly secured to a shaft 34. Shafts 34 and 124 extend through the machine and have mounted thereon on the opposite side of the base disks 79 and 80 which are used as cranks for reciprocating rods 81 and 82. By this arrangement gear 39 rotates rods 81 and 82 and will reciprocate and move upward and downward levers 53 and 54 which in turn moves upward and downward plungers 26 and 27, plunger 26 compressing material that is in openings or chambers 11 and plunger 27 ejecting the compressed material. Secured to shaft 34 is a cam 32 that is designed to rotate mold-wheel 5 intermittently or step by step, the movement of the wheel taking place while all the plungers are disengaged therefrom. As levers 53 and 54, together with plungers 26 and 27, move upward and downward cam 32 rotates and consequently mold-wheel 5 rotates. Mold-wheel 5 is designed to rotate as indicated by the arrow in Fig. 1 so that the chambers or openings 11 move toward plungers 26 immediately after the same have received material from hopper 111. After the material has been pressed by plungers 26 the mold-wheel 5 continues to rotate until a new mold or set of molds is brought beneath plungers 26 and they are again operated. This continues, and, as the material is pressed in the various chambers or openings 11 that pass beneath 26, they travel around to a position beneath 27 which in turn ejects the compressed material. A suitable chute is provided beneath the opening 6 for receiving the compressed material or finished article and which guides the same to a position outside the machine. In this receiving, compressing and ejecting of material in the mold or chambers the plungers that compress and eject the material are designed to move or reciprocate in a vertical plane. The plungers 26 are designed to simply reciprocate in ways secured to framework 43, and the sliding member that carries the plungers also carries a journal which is mounted in levers 53 and 54. This forms a pivotal bearing for levers 53 and 54 and, as will be evident, the bearing is movable in a vertical plane but not however in a horizontal plane. Plungers 27 are, as stated, designed to reciprocate in a vertical plane and to be guided in their movements by guide ways secured to framework 43. In order to permit this vertical movement and to convey motion from levers 53 and 54 the bearing carrying the supporting members to which plungers 27 are secured is mounted in a sliding journal box that reciprocates in a cut-away or hollowed out portion in levers 53 and 54. The movement of the plungers 27 in a vertical plane also assists in keeping the operating slides or pitmen in a vertical plane, the bearing for the same being secured to the member carrying the plungers.

What I claim is:

1. In a molding and pressing machine, a mold, means for compressing material in the mold, levers for operating said means, a pivotally mounted fulcrum, a sliding arm for securing said fulcrum to one of said levers, an arm connecting both of said levers, and means for relieving said fulcrum when excessive pressure is brought to bear thereon.

2. In a molding and pressing machine, a mold, means for compressing material in said mold, a pair of oppositely operating levers for operating said means, a fulcrum for one of said levers, a slidable shaft connected with said last mentioned lever and with said fulcrum, a yielding member engaging said shaft for relieving excessive pressure on said last mentioned lever, and means for operating both of said levers.

3. In a molding and pressing machine, a mold, means for compressing material in said mold, a pair of oppositely operating levers for operating said means, a pivotally mounted fulcrum for one of said levers, a slidable arm for connecting said lever and said fulcrum, a spring for relieving excessive pressure on said sliding arm, and means for operating both of said levers.

4. In a molding and pressing machine, a mold, means for compressing material in said mold, levers for operating said means, a pivotally mounted fulcrum, a sliding arm for connecting said fulcrum to one of said levers, an arm connecting both of said levers, a reciprocating bar mounted in said last mentioned arm for permitting separation of said levers when excessive pressure is brought to bear thereon, and yielding means for relieving said fulcrum when excessive pressure is brought to bear thereon.

5. In a molding and pressing machine, a rotating mold wheel, means for moving the same in successive steps, means for automatically filling the molds contained in said mold wheel, means for compressing the material in said mold wheel, a lever above and below said mold wheel for operating said compressing means, means for supporting said lower lever so as to permit a pivotal and reciprocatory movement thereof, a fulcrum for the lever mounted above said mold wheel, sliding means connected with said last mentioned lever guided by said fulcrum, an arm connecting both of said levers, and a spring carried by said arm and engaging said lever for relieving any excessive pressure on said lever.

In testimony whereof I have signed my name to this specification in the presence of two subscribing witnesses.

WILLIAM H. WYMAN.

Witnesses:
M. H. O'BRIEN,
A. R. WATERHOUSE.